US006176699B1

(12) United States Patent
Franjo et al.

(10) Patent No.: US 6,176,699 B1
(45) Date of Patent: Jan. 23, 2001

(54) PARISON HANDLING DEVICE

(75) Inventors: Vladimir Franjo; John F. Kenyon, both of Ontario (CA); Laszlo Papp, Fort Wayne, IN (US)

(73) Assignee: Walbro Corporation, Cass City, MI (US)

(*) Notice: Under 35 U.S.C. 154(b), the term of this patent shall be extended for 0 days.

(21) Appl. No.: 09/301,230

(22) Filed: Apr. 28, 1999

(51) Int. Cl.⁷ .......................... B29C 49/00; B29C 49/30; B29C 49/42
(52) U.S. Cl. .......................... 425/528; 425/534; 264/542
(58) Field of Search .................. 425/392, 388, 425/528, 532, 534, 522; 264/542, 540

(56) References Cited

U.S. PATENT DOCUMENTS

| | | | |
|---|---|---|---|
| 3,981,673 | * | 9/1976 | Sokolow ........................ 425/455 R |
| 4,351,631 | * | 9/1982 | Gessner et al. .................. 425/533 |
| 5,792,490 | * | 8/1998 | Geiger ................. 425/532 |
| 5,965,082 | * | 10/1999 | Tietto ................. 425/534 |

FOREIGN PATENT DOCUMENTS

| | | |
|---|---|---|
| 2135544 | 5/1995 | (CA). |
| 3737453 | * 5/1988 | (DE). |
| 371341 | * 6/1990 | (EP). |
| 03193326 | * 8/1991 | (JP). |
| 403261534 | * 11/1991 | (JP). |

* cited by examiner

Primary Examiner—Harold Pyon
Assistant Examiner—ThuKhanh Nguyen
(74) Attorney, Agent, or Firm—Reising, Ethington, Barnes, Kisselle, Learman & McCulloch, P.C.

(57) ABSTRACT

A parison handling device has a pair of opposed arms with each arm having at least a pair of grippers to selectively engage an extruded parison and transfer it to a second location such as to a mold of a blow molding machine. At least one gripper on each arm is both slidably and generally pivotally movable relative to the arm to facilitate initially engaging and gripping the parison and subsequent closing and stretching of a gripped end of the parison to more efficiently distribute the material of the parison such that after blow molding of the parison, the molded product has a substantially uniform wall thickness throughout. Preferably, a follower attached to each movable gripper is responsive to a profile or contour of a cam carried by each arm to guide the movement of the gripper corresponding to the profile of the cam. By adjusting or changing the profile of the cams, the slidable and pivotal movement of the grippers relative to the arm can be controlled to control the stretching of the parison and hence the distribution of the parison material as desired to form a particular product. By forming a product with a more uniform wall thickness, substantially less material is needed to form the product and therefore, the product may be formed at significantly lower cost.

12 Claims, 8 Drawing Sheets

PARISON HANDLING DEVICE

FIELD OF THE INVENTION

This invention relates generally to forming hollow plastic products and more particularly to an apparatus and method for handling a parison and transporting the parison to a mold.

BACKGROUND OF THE INVENTION

Hollow plastic products such as some fuel tanks and similar products, have been made by an extrusion and blow molding process. In this process, a molten plastic parison is formed by extrusion and then transferred to a blow molding machine wherein a pressurized fluid is introduced into the interior of the parison within the mold to force the molten parison into engagement with the interior walls of the mold. When cooled and solidified, the molded plastic part will have an exterior shape corresponding to the interior of the mold.

After extrusion and before being blow molded, the parison is hollow and has a generally cylindrical or tubular shape. In some applications, such as the production of automotive fuel tanks, the parison is large and may have a substantial length on the order of eight feet or longer. During transfer of the parison from the extruder to the blow molding machine it is imperative to prevent the collapse of the parison wall upon itself to maintain the hollow center of the parison in which the pressurized fluid is received to expand the parison within the mold.

Plastic products formed from prior blow molding processes have had non-uniform wall thicknesses with corners or other sharply contoured areas, and especially upper corners or contoured areas in the upper portion of the molded product, having substantially thinner walls compared to other portions of the molded product. Thus, to ensure that these contoured portions and especially the upper corner areas of a molded product have at least a necessary minimum wall thickness, the other portions of the product must be formed with walls which are thicker than necessary thereby substantially increasing the amount of material and the cost to manufacture the product.

One device used to transfer a molten parison from an extruder to a mold is disclosed in Canadian Patent No. 2,135,544. In this '544 patent a parison carrying device has a collar which engages the parison after it emerges from the extruder and transfers the parison to a mold without pinching or collapsing of the parison walls. The collar has first and second halves which are made to grip the parison and which have fingers which are either fixed and hence, not movable, or which may pivot about a fixed axis to enable the collar to pinch and close one end of the parison to permit an increased pressure to be developed within the interior cavity of the parison. These fingers whether fixed or pivoted about a fixed axis, do not provide any stretching or redistribution of the parison material and therefore, plastic products formed with use of this parison carrying device have the aforementioned problem of non-uniform wall thickness with upper corners and other contoured portions of the product formed with thinner walls than other portions of the product.

SUMMARY OF THE INVENTION

A parison handling device has a pair of opposed arms with each arm having at least a pair of grippers to selectively engage an extruded parison and transfer it to a second location such as to a mold of a blow molding machine. At least one gripper on each arm is both slidably and generally pivotally movable relative to the arm to facilitate initially engaging and gripping the parison and subsequent closing and stretching of a gripped end of the parison to more efficiently distribute the material of the parison such that after blow molding of the parison, the molded product has a substantially uniform wall thickness throughout. Preferably, a follower attached to each movable gripper is responsive to a profile or contour of a cam carried by each arm to guide the movement of the gripper corresponding to the profile of the cam. By adjusting or changing the profile of the cams, the slidable and pivotal movement of the grippers relative to the arm can be controlled to control the stretching of the parison and hence the distribution of the parison material as desired to form a particular product. By forming a product with a more uniform wall thickness, substantially less material is needed to form the product and therefore, the product may be formed at significantly lower cost.

Each arm preferably has three grippers thereon with each of a pair of movable grippers disposed on either side of a middle gripper fixed to the arm. Each movable gripper is driven by an actuator between retracted and advanced positions to facilitate engaging the molten parison and thereafter closing and stretching a gripped portion thereof. Desirably, when the arms are closed and the grippers are in their advanced positions a generally hexagonal geometry is defined to increase the surface area of engagement between the grippers and the parison.

Objects, features and advantages of this invention include providing a parison handling device which facilitates transfer of a molten parison to a mold, prevents undesirable collapsing of the parison before it is molded, stretches a molten parison before it is molded to more effectively distribute the material of the parison relative to the mold, enables a blow molded product having corner areas and other contoured portions to be formed with a substantially uniform wall thickness, substantially reduces the material needed to form a blow molded product, substantially reduces the cost to form a blow molded product, is readily adaptable to form products of different shapes and sizes, is reliable, durable, of relatively simple design and economical manufacture and assembly and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
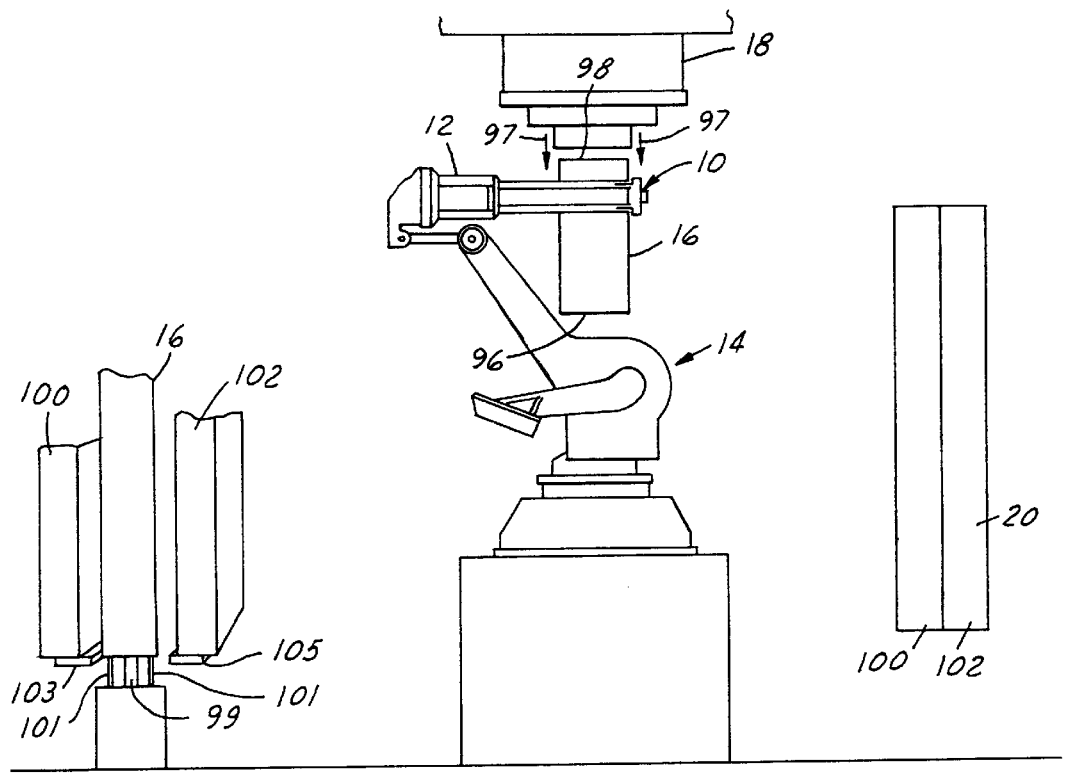
FIG. 1 is a diagrammatic view of a transfer mechanism having a parison handling device embodying the present invention for transferring a molten parison from an extruder to a blow molding machine.
Figure 2:
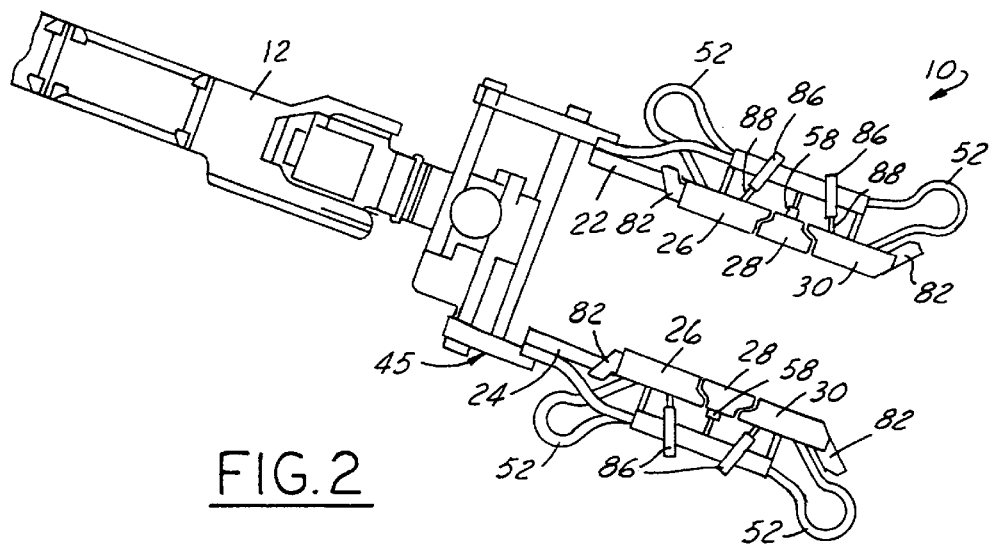
FIG. 2 is an enlarged diagrammatic view of the transfer mechanism and parison handling device of FIG. 1.
Figure 3:
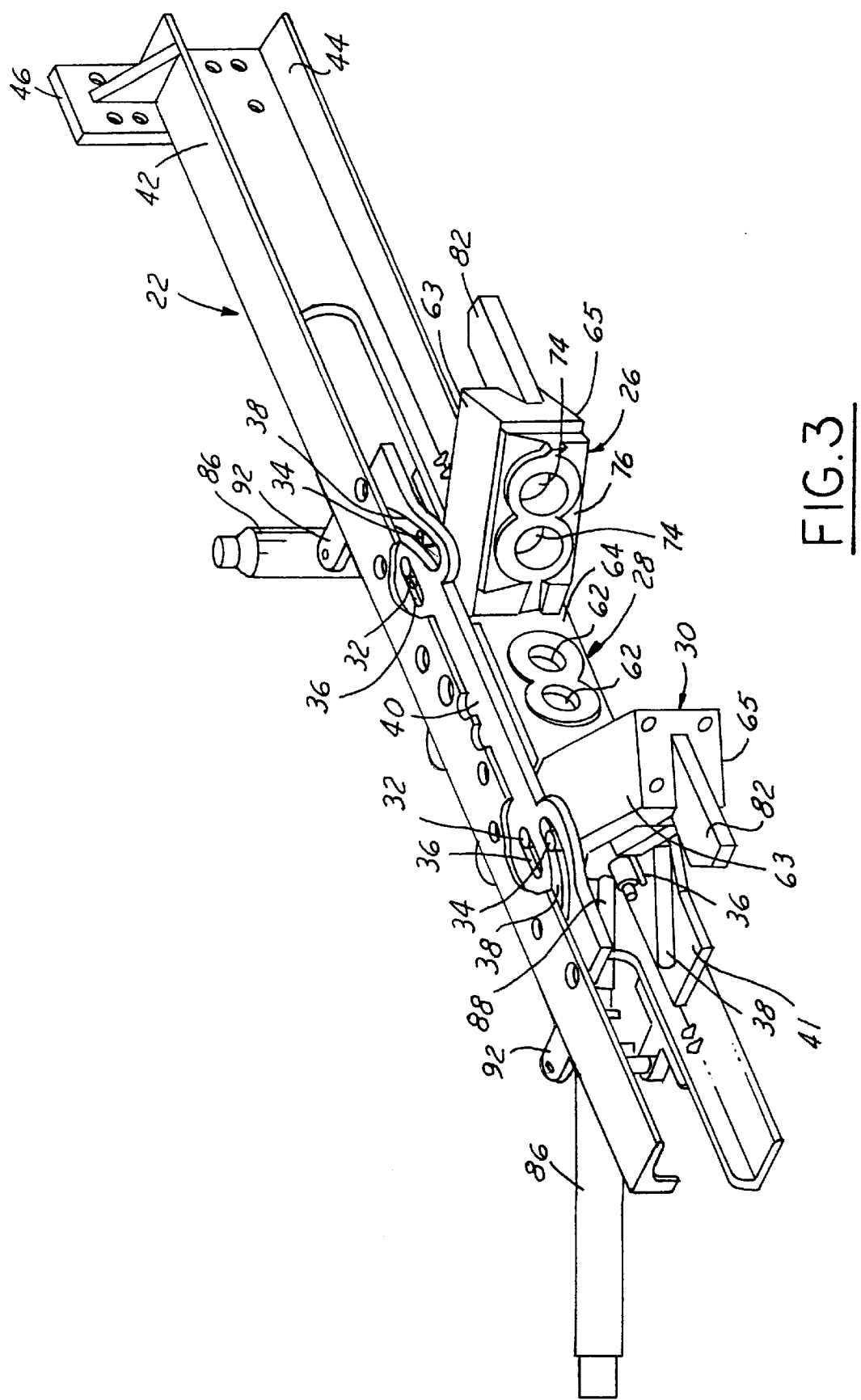
FIG. 3 is a perspective view of one arm of the parison handling device.

Referring in more detail to the drawings, FIG. 1 illustrates a parison handling device 10 attached to an arm 12 of a transfer mechanism such as a substantially automated robot 14 and manipulated by the robot 14 to transfer a molten plastic parison 16 from an extruder 18 to one of two or more molds 20 wherein a product is molded into its final shape. As best shown in FIG. 2, the parison handling device 10 comprises a pair of arms 22, 24 which are movable between open and closed positions to selectively engage and carry a parison 16. Three grippers 26, 28, 30 are preferably carried on each arm 22, 24 with a pair of outer grippers 26, 30 on each arm 22, 24 being movable relative to an associated middle gripper 28 preferably fixed to its associated arm 22, 24. As best shown in FIG. 3, each outer gripper 26, 30 carries at least one and preferably a pair of opposed followers 32, 34 each received in a separate one of a pair of slots 36, 38 in opposed cam plates 40, 41 fixed to each arm 22, 24 such that movement of each outer gripper 26, 30 is controlled by the profile or shape of the slots 36, 38 in the cam plates 40, 41. Desirably, each outer gripper 26, 30 moves both slidably and generally pivotally relative to its associated middle gripper 28 to facilitate initially engaging a parison 16 and subsequently stretching and closing one end of the parison 16 during manufacture of large hollow plastic products such as automotive fuel tanks to enable the fuel tanks, to be made with walls of substantially the same thickness.

As shown in FIGS. 2 and 4–8, each arm 22, 24 is carried and moved by the robot 14 from a fully open position (FIGS. 2 and 4) with the arms 22, 24 spaced from each other to a fully closed position (FIG. 8) with the arms together. As best shown in FIG. 3, each arm 22, 24 may be an elongate piece of channel iron having upper and lower walls 42, 44 and a mounting plate 46 at one end to connect the arms 22, 24 to a cross slide 45 carried by an arm of the robot 14. A pair of protective guards or covers 50 (FIGS. 4–8) are attached to each arm and extend on opposed sides along a plurality of conduits 52 which communicate a vacuum source with each of the grippers 26, 28, 30. Preferably, a main vacuum line 54 communicates the vacuum source with a manifold 56 which provides several outlets with one outlet for each conduit 52 which communicates with a separate one of the grippers 26, 28, 30.

A pair of cam plates 40, 41 are preferably attached to each arm 22, 24 with one cam plate 40 fixed to the upper wall 42 and the other cam plate 41 fixed to the lower wall 44 of each arm 22, 24. Each cam plate 40, 41 has a pair of generally longitudinal slots 36 and a pair of generally arcuate slots 38 which guide movement of the movable outer grippers 26, 30 both slidably or generally longitudinally and also generally pivotally relative to their arm 22, 24 and the middle gripper 28. Each slot 36, 38 has a predetermined profile or shape to define and control the movement of the outer grippers 26, 30 through a specific path of travel as desired for a particular application. The shape and location of the slots 36, 38 may be changed to provide a different path of travel of the outer grippers 26, 30 as desired for a particular application.

Each of the grippers 26, 28, 30 is preferably carried by an arm 22, 24 between the cam plates 40, 41 as best shown in FIG. 3. Each middle gripper 28 is preferably fixed to an arm 22, 24 with no relative movement between them. Generally arcuate recesses 57 formed in the middle grippers 28 provide clearance between the middle grippers 28 and the adjacent outer grippers 26, 30 as the outer grippers 26, 30 are moved relative to the middle grippers 28. A fitting 58 extending from each middle gripper 28 communicates a vacuum conduit 52 with an internal passage 60 formed in the middle gripper 28. The passage 60 communicates with each of a plurality of pockets 62 formed in the middle gripper 28 and opening to an inner surface 64 of the middle gripper 28. The number of pockets 62 formed in a middle gripper 28 can be varied as shown for example, in FIG. 3 and FIGS. 4–8 wherein each gripper has two pockets and three pockets, respectively. Preferably, to avoid adhering or sticking to the parison 16, each middle gripper 28 is formed of, or coated with teflon.

Figure 6:
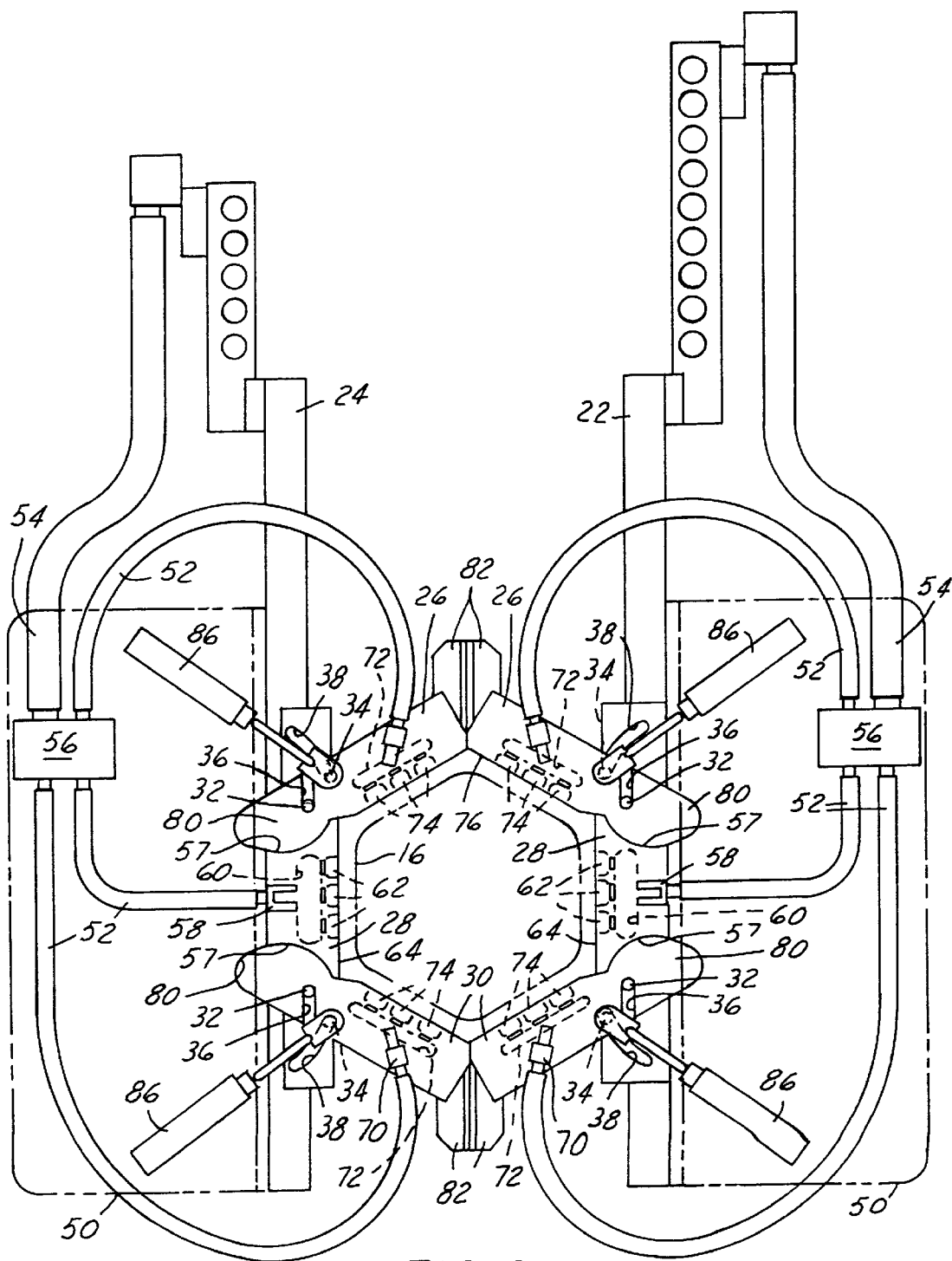
FIG. 6 is a top view of the parison handling device in a third position with the arms moved further towards their closed position with the grippers advanced and engaging a molten parison.

Each outer gripper 26, 30 has two followers 32, 34 on each of a pair of opposed faces 63, 65 with one follower 34 on each face 63, 65 slidably received in an arcuate slot 38 and the other follower 32 slidably received in a longitudinal slot 36 in each cam plate 40, 41. Desirably, each cam plate 40, 41 is generally symmetrical about the middle gripper 28 on its arm 22 or 24 to provide a symmetrical movement of the outer grippers 26, 30 relative to the middle gripper 28. A fitting 70 extending from each outer gripper 26, 30 communicates a conduit 52 with an internal passage 72 of each outer gripper 26, 30 which opens into each of a plurality of pockets 74 open to an inner surface 76 of the outer grippers 26, 30. Each outer gripper 26, 30 is preferably formed of or coated with teflon to prevent the parison 16 from adhering to the outer grippers 26, 30. Each outer gripper 26, 30 has a generally arcuate portion 80 which cooperates with an adjacent recess 57 in a middle gripper 28 to facilitate pivotal movement of the outer grippers 26, 30 relative to the middle grippers 28. Desirably, the arcuate portions 80 are closely fit to the recesses 57 to prevent any significant gaps from forming between the middle grippers 28 and the adjacent outer grippers 26, 30 to prevent any parison material from entering between them. As best shown in FIG. 6, a rib 82 extending outwardly from an outer end 84 of each outer gripper 26, 30 is constructed to cooperate with corresponding rib 82 of an outer gripper 26, 30 on the opposing arm 22, 24 when the outer grippers 26, 30 and arms 22, 24 are in an initial gripping position to pinch and seal any parison material extending beyond the outer grippers.

Figure 4:
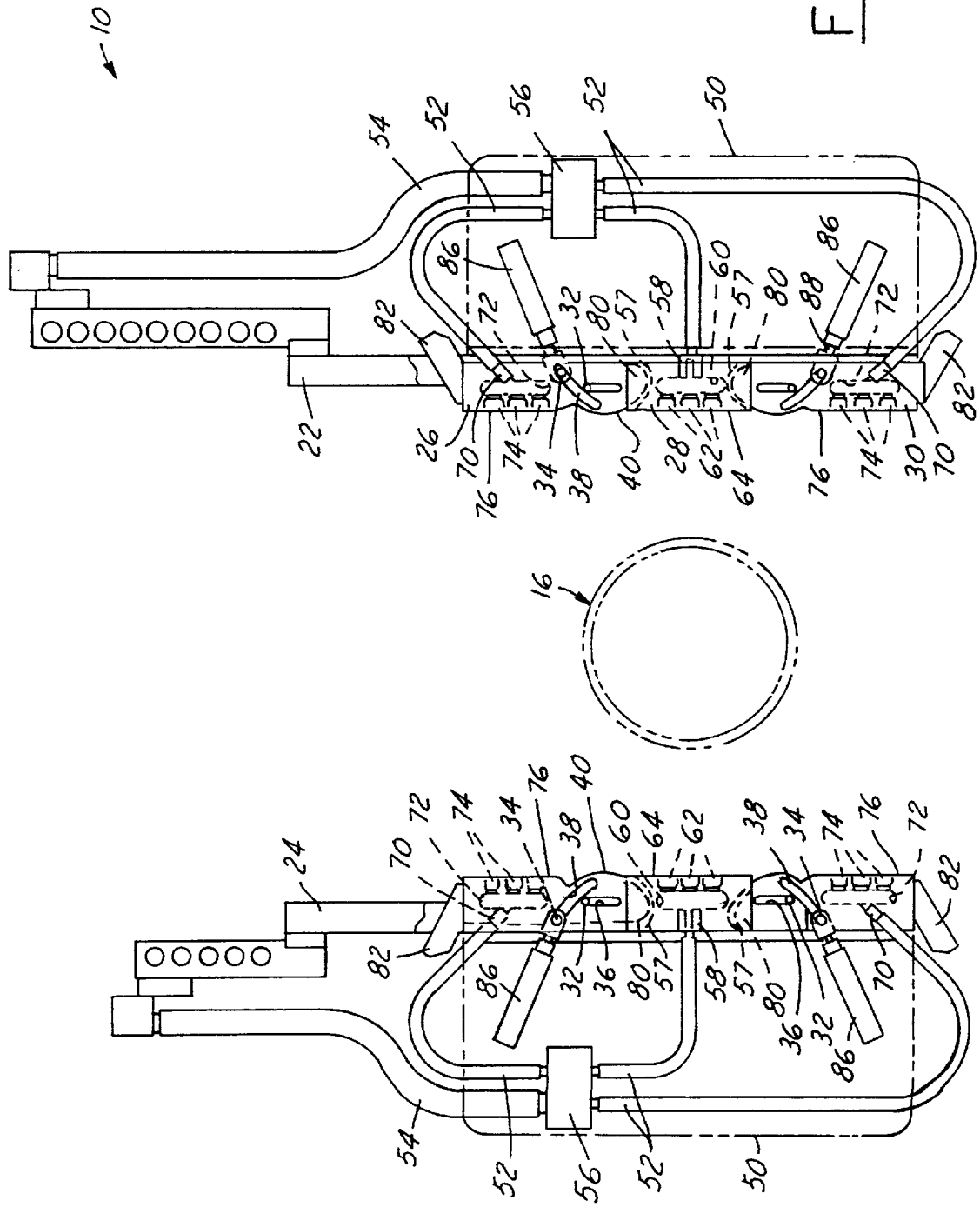
FIG. 4 is a top view of the parison handling device in a first position with the arms in an open position and the grippers in their retracted positions and spaced from a molten parison.
Figure 5:
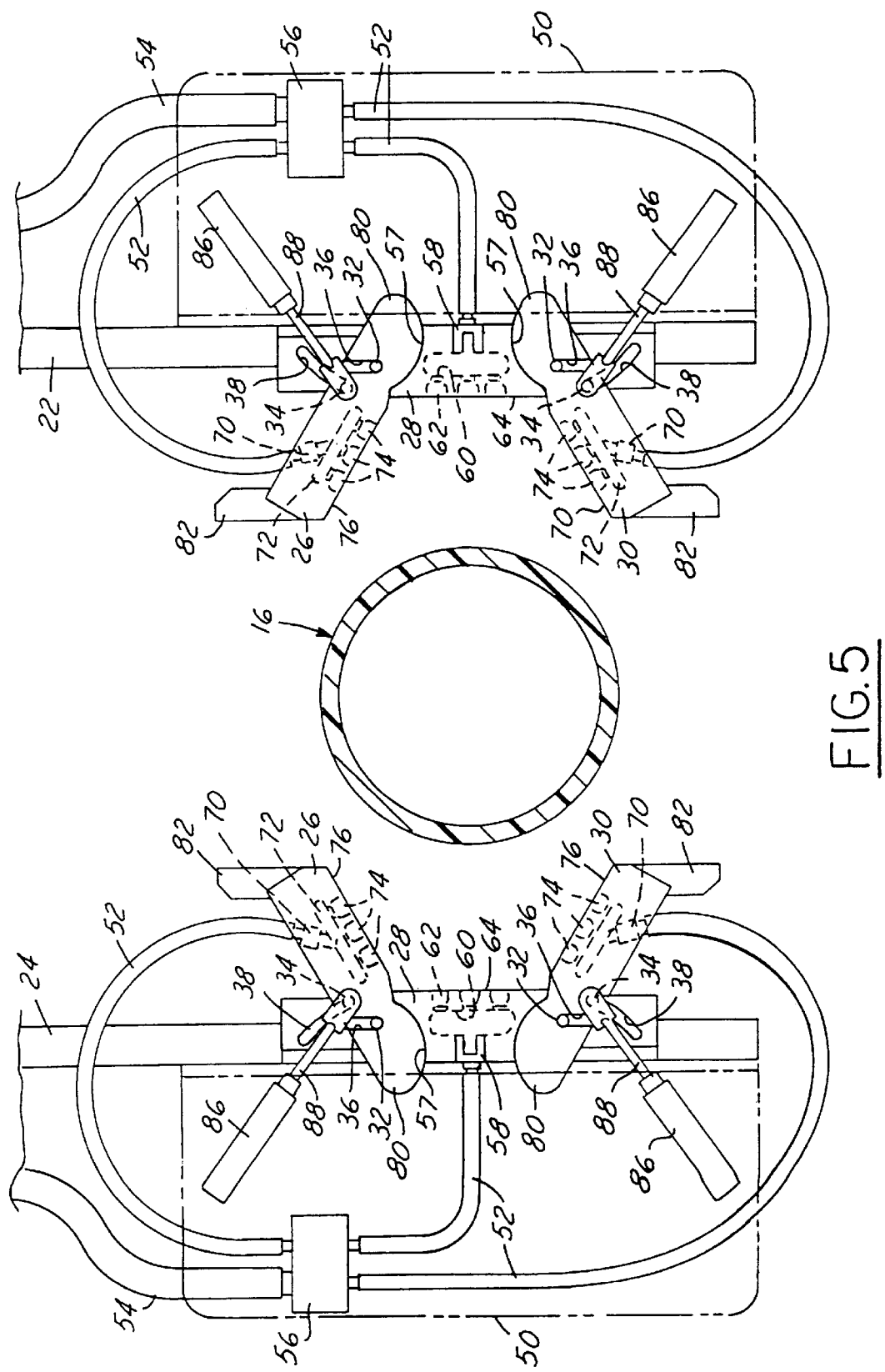
FIG. 5 is a top view of the parison handling device in a second position with the movable grippers on the arms in their advanced positions and the arms between their open and closed positions.
Figure 8:
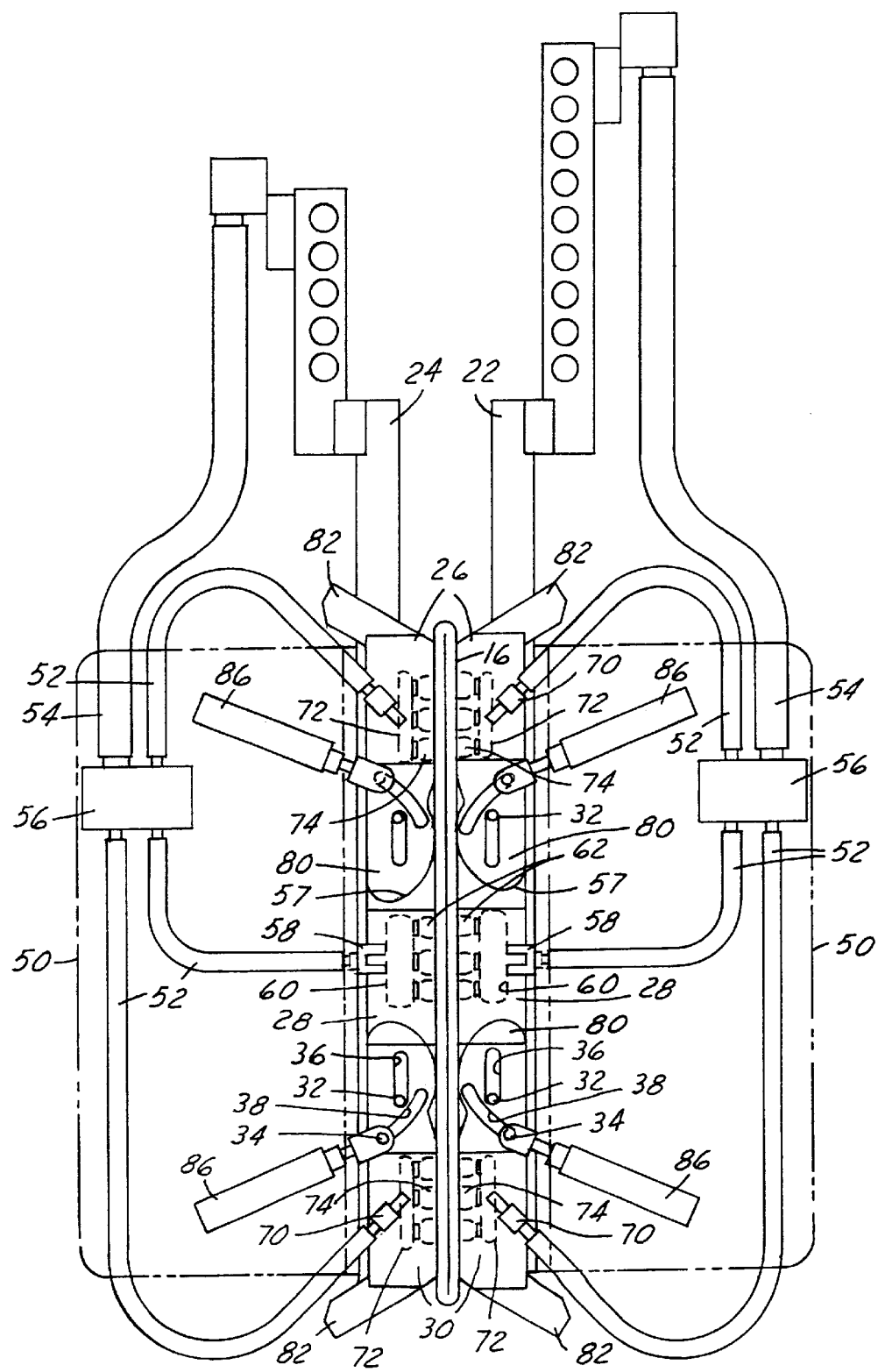
FIG. 8 is a top view of the parison handling device illustrating the arms in their fully closed position with the movable grippers in their fully retracted position to stretch, close and seal one end of the parison.

To move the outer grippers 26, 30 between their retracted position, as shown in FIGS. 2, 4 and 8, and their advanced position as shown in FIGS. 3, 5 and 6, each outer gripper 26, 30 has an actuator 86 with an actuating rod 88 fixed at one end to the outer grippers 26, 30. Each actuator 86 may be a pneumatic or hydraulic cylinder or some other power source capable of reciprocating an actuating rod 88 between retracted and extended positions to move an associated outer gripper 26, 30 between its retracted and advanced positions. Desirably, the actuators 86 are pivotally carried by trunnions received in brackets 92 (FIG. 3) extending from and fixed to each arm 22, 24. The pivotal connection of the actuators 86 to the arms 22, 24 permits the outer grippers 26, 30 to move both slidably and generally pivotally relative to the arms 22, 24 when driven by the actuating rod 88 which moves essentially linearly relative to the actuator 86.

As each actuating rod 88 is moved from its retracted position to its extended position, the outer grippers 26, 30 are moved along a path of travel controlled by the followers 32, 34 within the slots 36, 38 of the cam plates 40, 41. Each longitudinal slot 36 permits an outer gripper 26, 30 to slidably move generally laterally or longitudinally relative to its arm 22, 24 and associated middle gripper 28. The movement of the follower 34 in the arcuate slot 38 causes the outer end 84 of the outer grippers 26, 30 to pivot outwardly, away from its arm 22, 24, about the other follower 32 as the other follower 32 moves longitudinally in its slot 36. Thus, the engagement and sliding movement of the followers 32, 34 within their respective slots 36, 38 provides a compound motion of the outer grippers 26, 30 both slidably, in a longitudinal or lateral direction, and generally pivotally relative to the arms 22, 24 and middle grippers 28.

OPERATION

To form a hollow plastic product, such as an automotive fuel tank, a quantity of polymeric material is melted and extruded to provide a generally tubular, hollow molten plastic parison 16. Typically, plastic fuel containers have walls formed from multiple layers of different polymeric materials some of which provide strength and others which reduce the permeation of hydrocarbon fuel vapors to the atmosphere. For example, some fuel tanks have an inner and outer skin of high density polyethylene with one or more layers of ethylene vinyl alcohol received therebetween to provide a vapor barrier layer. Additionally, one or more resin or adhesive layers may be provided between the vapor barrier layer and the skin layers to adhere them together.

To form such a fuel tank, the various layers of the fuel tank material are co-extruded and emerge from the extruder 18 as a generally cylindrical, hollow multi-layer parison 16 open at its lower end 96 and upper end 98. As the parison 16 is emerging from the extruder 18 the parison handling device 10 is moved into position as shown in FIG. 4 for engagement with the upper end 98 of the parison 16 and each outer gripper 26, 30 is moved by an actuator 86 to its advanced position, as shown in FIG. 5, such that each outer gripper is pivotally inclined and slidably longitudinally retracted relative to its adjacent middle gripper 28. With the outer grippers 26, 30 in their position, the arms 22, 24 may be moved transversely toward each other by the lateral slides 45 to an initial parison gripping position as shown in FIG. 6. The lateral slides may be driven by a reversable stepper motor, pneumatic cylinder or other driving device through a pinion and rack arrangement.

In this initial gripping position, the ribs 82 of each outer gripper 26, 30 on arm 22 cooperate with the ribs 82 of an opposing outer gripper 26, 30 on arm 24 to pinch and seal any material between them and a generally hexagonal cavity is defined between the grippers 26, 28, 30 of each arm 22, 24. With a negative pressure or vacuum applied to each pocket 62, 74 from the vacuum source through the conduits 52 and internal passages 60, 72, the parison 16 is drawn outwardly in the direction of each gripper 26, 28, 30 and into engagement with the inner surface 64, 76 of each gripper 26, 28, 30 to prevent collapse of the parison 16 and to enable transfer of the parison 16 from the extruder to a mold. The vacuum applied through each pocket 62, 74 usually draws some of the parison material into each pocket 62, 74 creating projections extending outwardly of the parison 16 and into the pockets 62, 74 to improve the gripping and carrying of the parison 16 by the handling device 10. Thus, in the initial gripping position (FIG. 6), each gripper engages the exterior surface of the parison 16 and forms the upper end 18 of the molten parison 16 into a generally hexagonal shape. With each gripper 26, 28, 30 engaged with the parison 16, the arms 22, 24 are simultaneously moved downwardly (as indicated by arrows 97 in FIG. 1) away from the extruder 18 to break off or separate the parison from molten material in the extruder and remove the parison 16 from the extruder 18. With the parison drawn outwardly by the vacuum communicated therewith through each of the six grippers, the parison 16 is removed from the extruder without pinching or closing off the upper end 98 of the parison 16.

Figure 7:
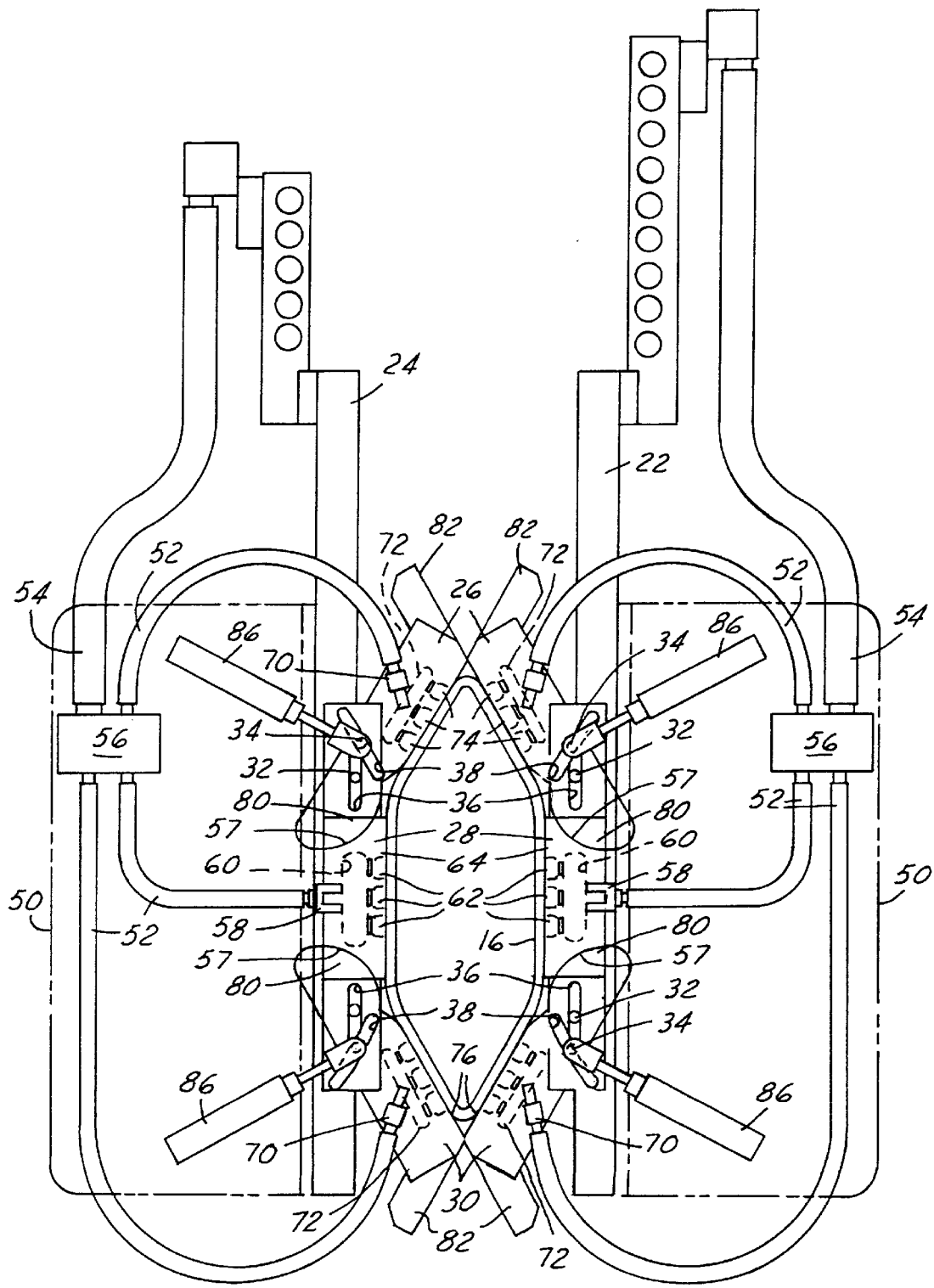
FIG. 7 is a top view of the parison handling device in a fourth position with the arms moved further towards their closed position and the movable grippers being partially returned to their retracted position to stretch the parison.

After the parison 16 has been gripped and detached from the extruder 18, the robot transfers the parison to a mold 20 and the upper end 98 or neck of the parison 16 engaged by the grippers 26, 28, 30 is stretched, as shown in FIGS. 7 and 8, by simultaneously moving the arms 22, 24 towards each other and moving the outer grippers 26, 30 towards their pivotally retracted and longitudinally slidably extended positions of the outer grippers 26, 30 relative to the middle gripper 28. This movement of the outer grippers 26, 30 increases the longitudinal distance between the vacuum pockets 74 of the outer grippers 26, 30 and the vacuum pockets 62 of the adjacent middle grippers 28 to increase the perimeter length or circumferential extent of the upper end 98 of the parison 16 by stretching it. Desirably, this redistributes some of the parison material adjacent the upper end 98 of the parison 16 to provide additional material for forming adjacent corner areas or contoured portions of the wall of the hollow product to enable the product to be formed with a substantially uniform wall thickness throughout.

After the parison 16 is delivered into a mold 20, it may be desirable to provide a super atmospheric pressure within the interior of the parison 16 to maintain its generally hollow shape and to prevent it from collapsing when transferred into the mold 20. To do this, as shown in FIG. 1, a needle 99 is typically inserted in the open lower end 96 of the parison 16 to provide a pressurized gas, such as compressed air, into the interior of the parison 16. Stretching pins 101 are also inserted in the open lower end 96 and are moved away from each other to engage and stretch the lower end 96 of the parison 16. After this stretching, pinch plates 103, 105 are advanced towards each other to pinch and seal the lower end 96 of the parison 16 with the needle 99 remaining in the parison 16.

To permit an increased pressure to develop within the parison 16, the upper end 98 of the parison 16 must be closed. To close the upper end 98 of the parison 16, as shown in FIG. 8, the arms 22, 24 are moved further towards each other to their fully closed position and the outer grippers 26, 30 are moved to their fully pivotally retracted and longitudinally extended positions. Notably, the movement of the outer grippers 26, 30 to this position provides additional longitudinal sliding movement of the outer grippers 26, 30 away from the middle gripper 28 to further stretch the parison 16 as the upper end 98 is being closed. When the upper end 98 is closed, a low pressure (pre-blow) may develop within the interior of the parison 16 to prevent the parison 16 from collapsing as it is placed into the mold.

After the molten parison 16 is received within a mold 20, opposed halves 100, 102 of the mold 20 are closed and an high pressure (blow) is admitted into the interior of the parison 16 to expand it outwardly into engagement with the interior surface of the mold 20. After being blown outwardly into engagement with the mold 20 cavity, the polymeric material is permitted to cool and solidify sufficiently such that when it is removed from the mold 20, the molded part has and retains a shape corresponding to the surface of the mold 20 cavity. The upper portion 98 or neck and the lower portion 96 of the parison 16 which were pinched together and closed prior to inserting the parison 16 into the mold 20 may be machined off of the finished molded product.

Figure 9:
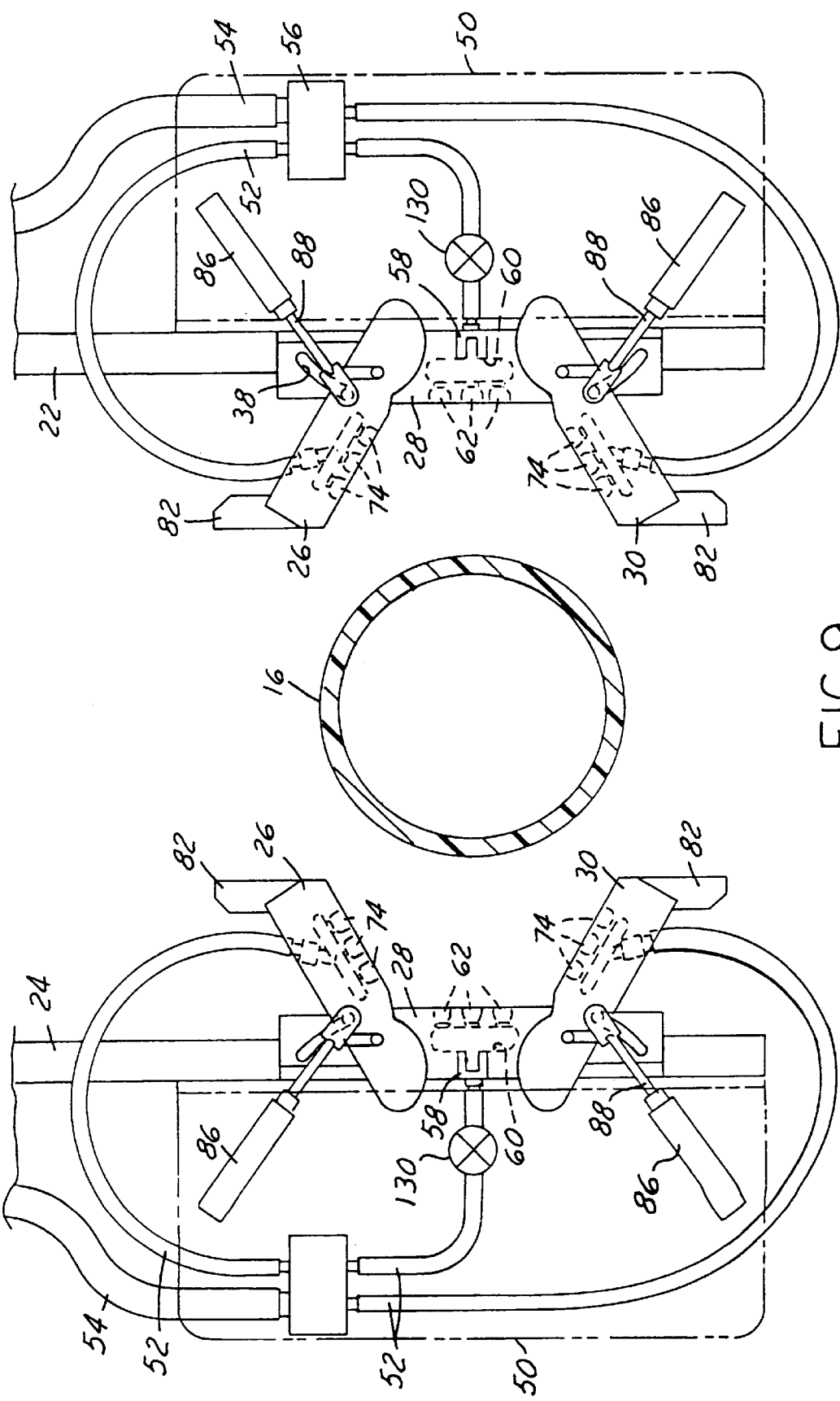
FIG. 9 is a top view of a modified parison handling device having valves capable of terminating the vacuum applied to the middle grippers.

As shown in FIG. 9, a valve 130 may be provided between the manifold 56 and the middle gripper 28 of each arm 22, 24 to selectively provide the vacuum to the pockets 62 of the middle grippers 28. Desirably, when the outer grippers 26, 30 and arms 22, 24 are moved to close and stretch the parison 16 as previously described, each valve 130 may be closed to terminate the application of the vacuum to the parison 16 through the middle grippers 28. Then, the parison material between the outer grippers 26, 30 on each arm can be stretched. Without terminating the vacuum applied to the middle grippers 28, only the material between middle grippers 28 and the adjacent outer grippers 26, 30 can be stretched (specifically, only the material between the outermost pocket 62 of each middle gripper 28 and the immediately adjacent or innermost pocket 74 of the outer grippers 26, 30 may be stretched) with the material at and between the pockets 62 of the middle grippers 28 held by the vacuum and prevented from stretching. This limits the amount by which the outer grippers 26, 30 can stretch the parison 16 without forming undesirably thin parison wall sections or tearing the parison 16. With the addition of the valves 130, more material is available to be stretched to avoid these problems.

By stretching the upper end 98 of the parison 16 with the slidable and generally pivotal movement of the outer grippers 26, 30 relative to the middle grippers 28 and arms 22, 24, the material of the parison 16 can be better distributed to enable blow molding of a part having a substantially uniform wall thickness throughout. Notably, significantly less material is required to form a product as material can be distributed to areas of a parison which will subsequently form upper corner areas or contoured portions in the upper portion of the final molded product to ensure the final product will have a sufficient wall thickness at these upper, contoured areas. Thus, excess material is not needed for the remaining portions of the plastic product which can thus be made thinner and more uniformly. Thus, the cost to manufacture each plastic product is dramatically reduced because of the decreased amount of material which is used to form the final product and which must be processed for each product. In use of one embodiment of the handling device, the volume of material needed to form a fuel tank was reduced by about 10–15% providing a substantial cost savings both in material and processing to melt and extrude the parison and mold the parison into a fuel tank.

What is claimed is:

1. A parison handling and carrying device, comprising:
   a pair of arms with at least one arm movable towards and away from the other arm to permit selective engagement with a parison having a tubular portion received between them and carrying of the parison;
   at least one cam carried by each arm and having a profile;
   at least two grippers carried by each arm with at least one gripper on each arm being movable relative to the arm between advanced and retracted positions to vary the longitudinal distance between at least a pair of adjacent grippers;
   at least one follower carried by at least one movable gripper of each arm with each follower being responsive to the profile of an associated cam to control the movement of its associated movable gripper; and
   a separate actuator carried by each arm and operably connected to each movable gripper to move the movable grippers between their advanced and retracted positions, whereby when displaced by an actuator the engagement of a follower with a cam determines the path of travel of said movable gripper with the path of travel relative to the arm increasing the longitudinal distance between at least a pair of adjacent grippers constructed and configured to stretch the material of a parison received between the grippers and to close the tubular portion of the parison received between the grippers as the arms are moved relatively toward each other for carrying and handling the parison.

2. The handling device of claim 1 wherein each movable gripper which carries a follower moves both slidably and pivotally relative to its arm.

3. The handling device of claim 1 which also comprises at least one vacuum pocket formed in each gripper and constructed to apply a vacuum source to a portion of the parison engaged by the gripper to draw and hold the parison onto the gripper.

4. The handling device of claim 1 wherein when the grippers are in their retracted positions they are aligned with each other and with the arm and when the movable grippers are in their advanced positions the movable grippers are inclined relative to each other and at an angle from the arm.

5. The handling device of claim 1 wherein each cam is a cam plate with at least one cam plate carried by each arm and with the profile of each cam defined in a slot formed in a cam plate with each follower received in a slot to control the movement of the movable grippers.

6. The handling device of claim 5 wherein each movable gripper carries a pair of followers and each cam plate has one slot for each follower of a movable gripper.

7. The handling device of claim 6 wherein each cam plate has a first slot extending longitudinally of the arm and a second slot which spans an arc to control the pivotal movement of a movable gripper relative to the arm.

8. The handling device of claim 4 wherein three grippers are provided on each arm with a pair of movable grippers disposed on opposed sides of a middle gripper fixed to the arm.

9. The handling device of claim 8 wherein when an arm is moved towards the other arm to engage the parison and the movable grippers are moved to their advanced positions, a hexagonal opening is defined between the grippers of each arm.

10. The handling device of claim 8 wherein when the movable grippers are moved from their advanced positions to their retracted positions, they move slidably away from the middle gripper while also moving pivotally.

11. The handling device of claim 1 wherein each movable gripper has a rib extending therefrom constructed to cooperate with a rib of a movable gripper of an opposed arm to pinch and seal any parison material between the ribs when the arms are moved into a position to engage an object between them.

12. The handling device of claim 8 which also comprises at least one vacuum pocket formed in each gripper and constructed to communicate a vacuum source with a portion of the parison engaged by the gripper to draw and hold the portion of the parison onto the gripper and a valve disposed between the vacuum pockets of each middle gripper and the vacuum source to control the application of the vacuum from the vacuum source to the middle grippers.

* * * * *